US012689930B2

(12) United States Patent
Rosa et al.

(10) Patent No.: US 12,689,930 B2
(45) Date of Patent: Jul. 21, 2026

(54) CONFIGURATION OF SIGNAL MEASUREMENTS AT USER EQUIPMENT DURING IDLE PERIODS OF WIRELESS COMMUNICATION CHANNEL

(71) Applicant: Nokia Technologies Oy, Espoo (FI)

(72) Inventors: Claudio Rosa, Aalborg (DK); Timo Erkki Lunttila, Espoo (FI); Jarkko Tuomo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 359 days.

(21) Appl. No.: 18/682,060

(22) PCT Filed: Aug. 16, 2021

(86) PCT No.: PCT/EP2021/072725
§ 371 (c)(1),
(2) Date: Feb. 7, 2024

(87) PCT Pub. No.: WO2023/020678
PCT Pub. Date: Feb. 23, 2023

(65) Prior Publication Data
US 2024/0349107 A1 Oct. 17, 2024

(51) Int. Cl.
*H04W 24/10* (2009.01)
(52) U.S. Cl.
CPC ................................... *H04W 24/10* (2013.01)
(58) Field of Classification Search
CPC ..... H04W 24/10; H04W 72/23; H04W 16/14; H04W 72/0446; H04W 72/12; H04W 74/0808
See application file for complete search history.

(56) References Cited

U.S. PATENT DOCUMENTS

2019/0342045 A1   11/2019   Radulescu et al.
2020/0367086 A1   11/2020   Wen et al.
(Continued)

FOREIGN PATENT DOCUMENTS

WO   2014/116149 A1   7/2014

OTHER PUBLICATIONS

"3rd Generation Partnership Project; Technical Specification Group Radio Access Network; Physical layer procedures for shared spectrum channel access (Release 16)", 3GPP TS 37.213, V16.5.0, Mar. 2021, pp. 1-27.

(Continued)

*Primary Examiner* — Ricky Q Ngo
*Assistant Examiner* — Kabir U Jahangir
(74) *Attorney, Agent, or Firm* — Nokia Technologies Oy

(57) ABSTRACT

The present disclosure relates to a technique for configuring signal measurements to be performed for a wireless communication channel. More specifically, a network node generates a first timing configuration for the wireless communication channel and sends it to a UE. The first timing configuration defines a sequence of Fixed Frame Periods (FFPs). Then, the network node generates a second timing configuration for the wireless communication channel and sends it to the UE. The second timing configuration comprises an indication for the UE to perform the signal measurements (e.g., RSSI measurements) within at least part of an idle period of at least one FFP of the sequence of FFPs. By so doing, it is possible (by using a limited signaling overhead) to ensure that the signal measurements will be always performed within the idle period(s) of the FFP(s). In some embodiments, the indication may cause the UE to perform the signal measurements within the at least part of every N-th FFP (e.g., every second FFP) of the sequence of (Continued)

600

S602 — Receiving a first timing configuration (FFP) for a wireless communication channel from a network node S604 — Receiving a second timing configuration (signal measurement) for the wireless communication channel from the network node S606 — Performing the signal measurement based on the first timing configuration and the second timing configuration FFPs, thereby providing a more flexible configuration of the signal measurements in a wireless communication network.

19 Claims, 7 Drawing Sheets

(56)                References Cited

U.S. PATENT DOCUMENTS

| | | | | |
|---|---|---|---|---|
| 2023/0354275 | A1* | 11/2023 | Moon ............... | H04W 72/0446 |
| 2024/0098781 | A1* | 3/2024 | Tsai .................. | H04W 74/0808 |
| 2024/0259899 | A1* | 8/2024 | Hathiramani ..... | H04W 36/0088 |

OTHER PUBLICATIONS

"5 GHz RLAN; Harmonised Standard covering the essential requirements of article 3.2 of Directive 2014/53/EU", ETSI EN 301 893, V2.1.1, May 2017, pp. 1-122.

"Revised WID: Enhanced Industrial Internet of Things (IoT) and ultra-reliable and low latency communication (URLLC) support for NR", 3GPP TSG RAN Meeting #91e, RP-210854, Agenda: 9.7.5, Nokia, Mar. 16-26, 2021, 6 pages.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"On LAA RRM measurement and carrier selection", 3GPP TSG RAN WG1 Meeting #82, R1-154074, Agenda: 7.2.4.2.2, ZTE, Aug. 24-28, 2015, pp. 1-2.

"IEEE 802.11", Wikipedia, Retrieved on May 27, 2024, Webpage available at : https://en.wikipedia.org/wiki/IEEE_802.11.

International Search Report and Written Opinion received for corresponding Patent Cooperation Treaty Application No. PCT/EP2021/072725, dated May 9, 2022, 14 pages.

"LTE; 5G; Physical layer procedures for shared spectrum channel access (3GPP TS 37.213 version 16.3.0 Release 16)", ETSI TS 137 213, V16.3.0, Nov. 2020, 28 pages.

"RMTC alignment and HARQ granularity", 3GPP TSG-RAN WG2 Meeting #116 Electronic, R2-2110558, Agenda: 8.21.2.1, Nokia, Nov. 1-12, 2021, 41 pages.

* cited by examiner

200

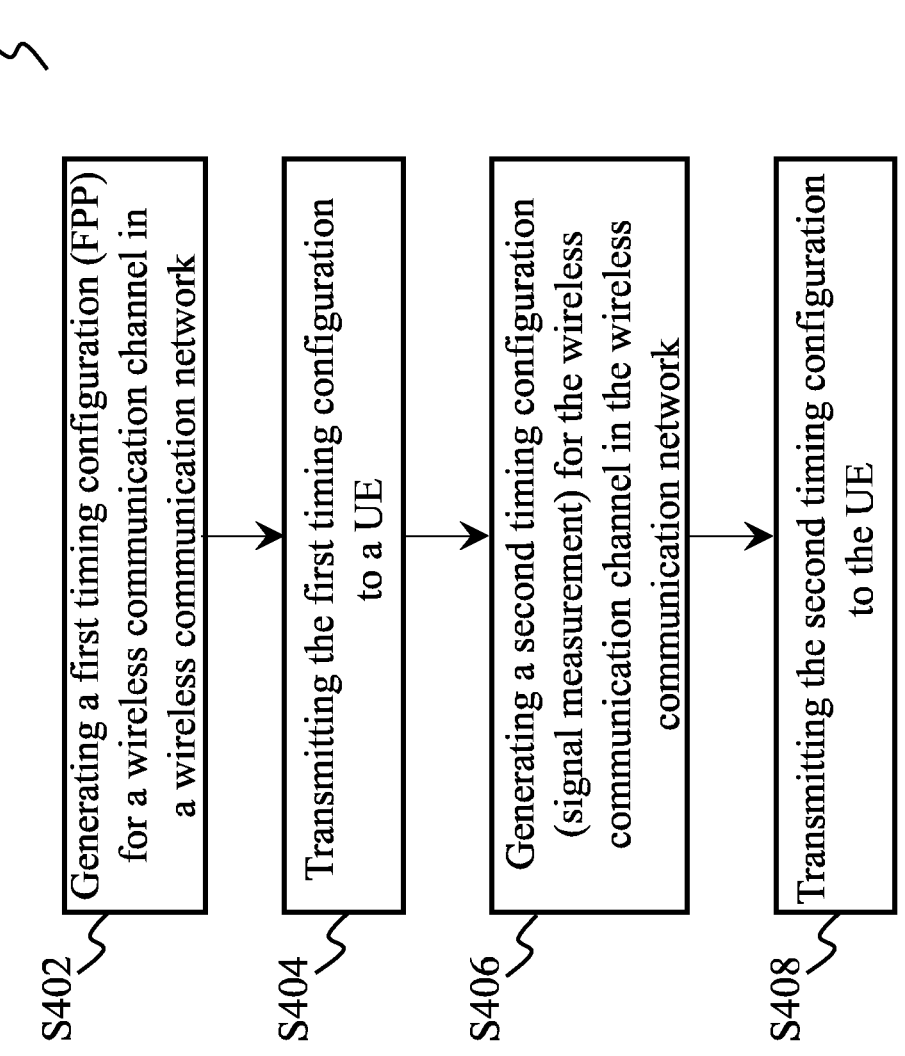

400

S402 Generating a first timing configuration (FPP) for a wireless communication channel in a wireless communication network S404 Transmitting the first timing configuration to a UE S406 Generating a second timing configuration (signal measurement) for the wireless communication channel in the wireless communication network S408 Transmitting the second timing configuration to the UE

S602 — Receiving a first timing configuration (FFP) for a wireless communication channel from a network node S604 — Receiving a second timing configuration (signal measurement) for the wireless communication channel from the network node S606 — Performing the signal measurement based on the first timing configuration and the second timing configuration

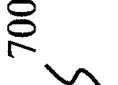

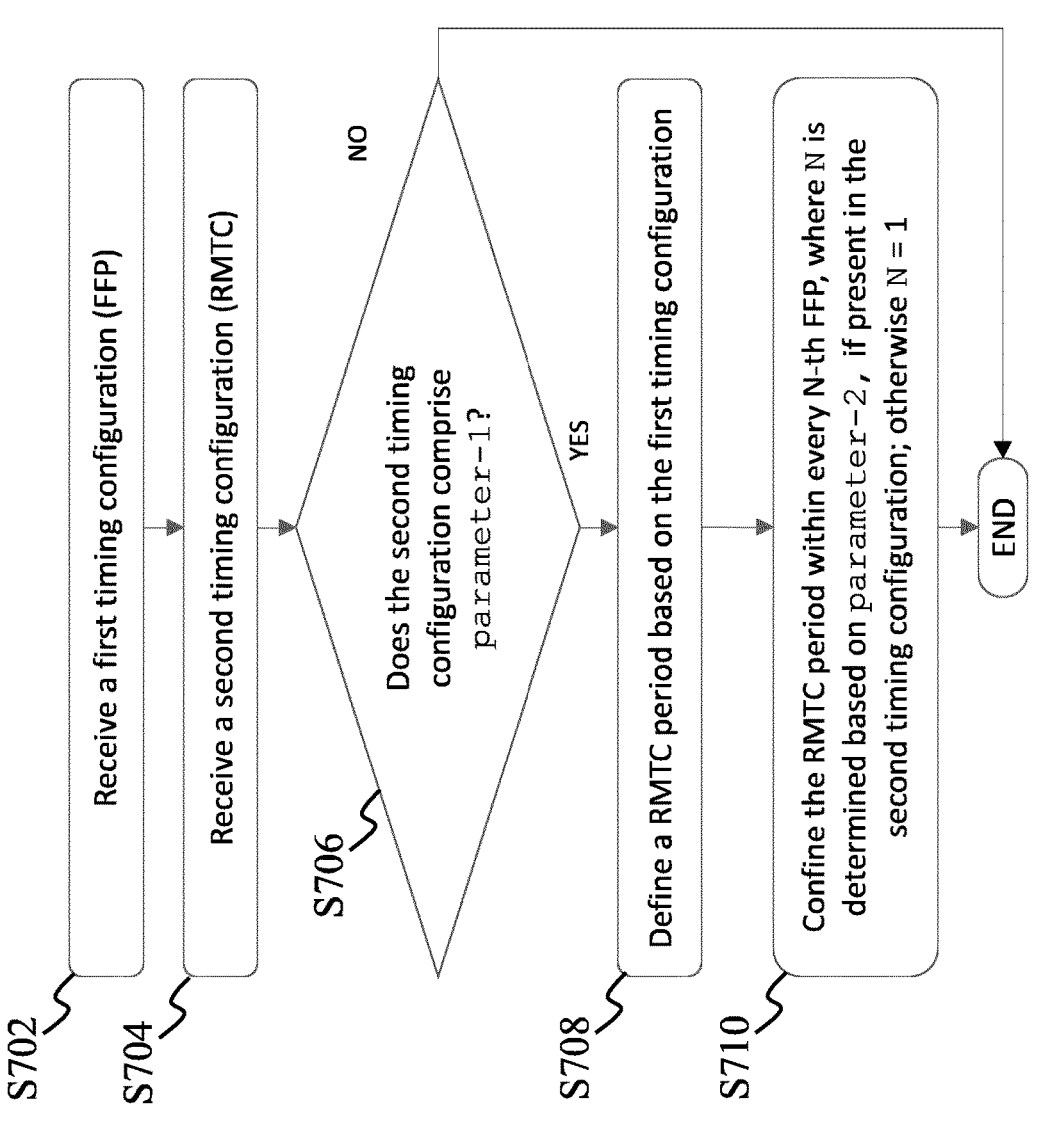

S702 — Receive a first timing configuration (FFP)

S704 — Receive a second timing configuration (RMTC)

S706 — Does the second timing configuration comprise parameter-1?

NO

YES

S708 — Define a RMTC period based on the first timing configuration

S710 — Confine the RMTC period within every N-th FFP, where N is determined based on parameter-2, if present in the second timing configuration; otherwise N = 1

END

FIG. 7

CONFIGURATION OF SIGNAL MEASUREMENTS AT USER EQUIPMENT DURING IDLE PERIODS OF WIRELESS COMMUNICATION CHANNEL

RELATED APPLICATION

This application claims priority to PCT Patent Application No. PCT/EP2021/072725, filed 16 Aug. 2021, which is incorporated herein by reference in its entirety.

TECHNICAL FIELD

The present disclosure relates generally to the field of wireless communications and, in particular, to techniques for configuring signal measurements at a User Equipment (UE) such that they are performed within idle periods of a wireless communication channel.

BACKGROUND

When operating in a 5 GHz or 6 GHz unlicensed spectrum, one allowed channel access mechanism is the so-called Frame Based Equipment (FBE), which in the 3rd Generation Partnership Project (3GPP) is also specified as semi-static channel occupancy. This channel access procedure for semi-static channel access is specified in 3GPP TS 37.213 Section 4.3 "Semi-static channel occupancy". Such a procedure is based on the concept of a fixed frame period (FFP) which consists of a periodic channel occupancy time followed by an idle period.

To achieve Ultra-Reliable Low-Latency Communications (URLLC) over the unlicensed spectrum, New Radio-Unlicensed (NR-U) gNBs may be deployed so that their FFPs are synchronized, i.e., the idle periods of their FFPs are perfectly aligned. In this way, when each gNB performs Clear Channel Assessment (CCA)/Listen Before Talk (LBT) prior to a transmission at the start of its FFP, the impact of intra-system interference on the CCA/LBT (i.e., when neighboring gNBs block each other), hence on the latency of the transmission, can be avoided. Such an operational mode with semi-static and synchronized channel access is particularly suited for operation in environments with no inter-system interference (e.g., within a factory hall). On the other hand, sporadic inter-system interference on an unlicensed channel in a 5 GHz or 6 GHz band can always happen. It would therefore be beneficial to be able to configure UEs to perform intra-frequency Received Signal Strength Indicator (RSSI) measurements in time intervals when there is no intra-system interference (i.e., within the idle periods of the FFPs). In this way, the gNBs can timely detect the unexpected and unwanted inter-system interference in the unlicensed channel(s) and take appropriate recovery actions.

However, it is not always possible to configure the RSSI measurements such that they are performed exclusively during the idle periods of the FFPs. Therefore, when performing the intra-frequency RSSI measurements (i.e., on the same frequency as a serving cell), the UEs will, in addition to other network deployments, also measure (and report) signal components from the serving cell and from neighboring cells of the same network deployment (i.e., the intra-system interference). Therefore, such a measurement (and report) will be not indicative of an inter-system interference level on the corresponding unlicensed channel(s).

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that allows signal measurements to be configured at a UE such that they are performed within idle periods of a wireless communication channel.

The objective above is achieved by the features of the independent claims in the appended claims. Further embodiments and examples are apparent from the dependent claims, the detailed description and the accompanying drawings.

According to a first aspect, a UE in a wireless communication network is provided. The UE comprises a transceiver, a processor coupled to the transceiver, and a memory coupled to the processor and storing processor-executable instructions. When executed, the processor-executable instructions cause the processor to operate as follows. At first, the processor uses the transceiver to receive a first timing configuration for a wireless communication channel in the wireless communication network from a network node. The first timing configuration comprises a sequence of fixed frame periods (FFPs). Each FFP of the sequence of FFPs comprises a channel occupancy period and an idle period for the wireless communication channel. The channel occupancy period is followed by the idle period. Then, the processor uses the transceiver to receive a second timing configuration for the wireless communication channel from the network node. The second timing configuration comprises an indication for the UE to perform a signal measurement during at least part of the idle period of at least one FFP of the sequence of FFPs. After that, the processor performs the signal measurement based on the first timing configuration and the second timing configuration. By so doing, it is possible to ensure (by using a limited signaling overhead) that the signal measurement(s) will be always performed at the UE within the idle period(s) of the FFP(s).

In one example embodiment of the first aspect, the indication in the second timing configuration causes the UE to perform the signal measurement during the whole idle period of the at least one FFP of the sequence of FFPs. With such an indication, the UE may properly configure the signal measurements.

In one example embodiment of the first aspect, the indication in the second timing configuration causes the UE to perform the signal measurement during the at least part of the idle period of each FFP of the sequence of FFPs. With such an indication, the UE may properly configure the signal measurements.

In one example embodiment of the first aspect, the indication in the second timing configuration causes the UE to perform the signal measurement during the at least part of the idle period of every N FFP of the sequence of FFPs, where N is a natural number equal to or greater than two. By varying N, it is possible to achieve a different time sequence of signal measurements. For example, N equal to 2 means that the signal measurement should be performed within the idle period of every second FFP of the sequence of FFPs. This may also provide a more flexible configuration of the signal measurements in the wireless communication network.

In one example embodiment of the first aspect, the processor is configured to receive the first timing configuration from the network node via at least one of broadcast signaling and a dedicated signaling. By using these types of signaling, the UE may be properly informed about the sequence of FFPs. At the same time, the dedicated signaling may be used if it is required to reduce the total signaling overhead in the wireless communication network.

In one example embodiment of the first aspect, the processor is configured to receive the second timing configuration from the network node via a dedicated signaling. By using this type of signaling, the UE may be informed about the above-mentioned indication in a UE-specific manner, thereby reducing the total signaling overhead in the wireless communication network.

In one example embodiment of the first aspect, the signal measurement comprises at least one of a Received Signal Strength Indicator (RSSI) measurement, a Reference Signal Received Power (RSRP) measurement, and a Reference Signal Received Quality (RSRQ). By using these types of signal measurements, the UE may properly measure the communication quality of the wireless communication channel.

In one example embodiment of the first aspect, the processor is further configured, after receiving the second timing configuration, to check whether at least one time symbol configured by the network node for the UE to perform an uplink (UL) transmission overlaps with the at least part of the idle period of the at least one FFP of the sequence of FFPs. If this is the case, the processor is further configured to decide not to use the at least one time symbol for the signal measurement. By so doing, the UE may select the most suitable time symbols within the idle period(s) for the signal measurement(s).

In one example embodiment of the first aspect, the processor is further configured to generate a measurement report based on the performed signal measurement and transmit, by using the transceiver, the measurement report to the network node. This report may be, for example, used by the network node to adjust transmission parameters, such as a modulation and coding scheme, resource block allocation, or transmit power, prior to performing a data transmission at the start of the next FFP (i.e., the next channel occupancy period). Additionally, the measurement report may be used by the network node to detect a hidden node transmitting on a corresponding unlicensed channel and to take appropriate actions (e.g., change an operating channel).

According to a second aspect, a network node in a wireless communication network is provided. The network node comprises a transceiver, a processor coupled to the transceiver, and a memory coupled to the processor and storing processor-executable instructions. When executed, the processor-executable instructions cause the processor to operate as follows. At first, the processor generates a first timing configuration for a wireless communication channel in the wireless communication network. The first timing configuration comprises a sequence of FFPs. Each FFP of the sequence of FFPs comprises a channel occupancy period and an idle period for the wireless communication channel. The channel occupancy period is followed by the idle period. Then, the processor uses the transceiver to transmit the first timing configuration to a UE. After that, the processor generates a second timing configuration for the wireless communication channel. The second timing configuration comprises an indication for the UE to perform a signal measurement during at least part of the idle period of at least one FFP of the sequence of FFPs. Next, the processor again uses the transceiver to transmit the second timing configuration to the UE. By so doing, it is possible (by using a limited signaling overhead) to ensure that the signal measurement(s) will be always performed at the UE within the idle period(s) of the FFP(s).

In one example embodiment of the second aspect, the indication in the second timing configuration causes the UE to perform the signal measurement during the whole idle period of the at least one FFP of the sequence of FFPs. With such an indication, the UE may properly configure the signal measurements.

In one example embodiment of the second aspect, the indication in the second timing configuration causes the UE to perform the signal measurement during the at least part of the idle period of each FFP of the sequence of FFPs. With such an indication, the UE may properly configure the signal measurements.

In one example embodiment of the second embodiment, the indication in the second timing configuration causes the UE to perform the signal measurement during the at least part of the idle period of every N FFP of the sequence of FFPs, where N is a natural number equal to or greater than two. By varying N, it is possible to achieve a different time sequence of signal measurements. For example, N equal to 2 means that the signal measurement should be performed within the idle period of every second FFP of the sequence of FFPs. This may also provide a more flexible configuration of the signal measurements in the wireless communication network.

In one example embodiment of the second aspect, the processor is configured to transmit the first timing configuration to the UE via at least one of broadcast signaling and a dedicated signaling. By so doing, the UE may be properly informed about the sequence of FFPs. At the same time, the dedicated signaling may be used if it is required to reduce the total signaling overhead in the wireless communication network.

In one example embodiment of the second aspect, the processor is configured to transmit the second timing configuration to the UE via a dedicated signaling. By so doing, the UE may be informed about the above-mentioned indication in a UE-specific manner, thereby reducing the total signaling overhead in the wireless communication network.

In one example embodiment of the second aspect, the signal measurement comprises at least one of a RSSI measurement, a RSRP measurement, and a RSRQ measurement. By using these types of signal measurements, the UE may properly measure the communication quality of the wireless communication channel.

In one example embodiment of the second aspect, the processor is configured to generate the second timing configuration such that the at least part of the idle period of the at least one FFP of the sequence of FFPs does not overlap with at least one time symbol configured for the UE to perform an UL transmission. By so doing, the network node itself may select, for the UE, the most suitable time symbols within the idle period(s) for the signal measurement(s).

In one example embodiment of the second aspect, the processor is further configured to receive, by using the transceiver, a measurement report from the UE. The measurement report is based on the signal measurement performed by the UE based on the first timing configuration and the second timing configuration. This report may be, for example, used by the network node to adjust transmission parameters, such as a modulation and coding scheme, resource block allocation, or transmit power, prior to performing a data transmission at the start of the next FFP (i.e., the next channel occupancy period). Additionally, the measurement report may be used by the network node to detect a hidden node transmitting on a corresponding unlicensed channel and to take appropriate actions (e.g., change an operating channel).

According to a third aspect, a method for operating a network node in a wireless communication network is provided. The method starts with the step of generating a first timing configuration for a wireless communication channel in the wireless communication network. The first timing configuration comprises a sequence of FFPs. Each FFP of the sequence of FFPs comprises a channel occupancy period and an idle period for the wireless communication channel. The channel occupancy period is followed by the idle period. Then, the method proceeds to the step of transmitting the first timing configuration to a UE. Next, the method goes on to the step of generating a second timing configuration for the wireless communication channel. The second timing configuration comprises an indication for the UE to perform a signal measurement during at least part of the idle period of at least one FFP of the sequence of FFPs. After that, the method proceeds to the step of transmitting the second timing configuration to the UE. By so doing, it is possible (by using a limited signaling overhead) to ensure that the signal measurement(s) will be always performed at the UE within the idle period(s) of the FFP(s).

According to a fourth aspect, a method for operating a UE in a wireless communication network is provided. The method starts with the step of receiving a first timing configuration for a wireless communication channel in the wireless communication network from a network node. The first timing configuration comprises a sequence of FFPs. Each FFP of the sequence of FFPs comprises a channel occupancy period and an idle period for the wireless communication channel. The channel occupancy period is followed by the idle period. Then, the method proceeds to the step of receiving a second timing configuration for the wireless communication channel from the network node. The second timing configuration comprises an indication for the UE to perform a signal measurement within at least part of the idle period of at least one FFP of the sequence of FFPs. After that, the method goes on to the step of performing the signal measurement based on the first timing configuration and the second timing configuration. By so doing, it is possible (by using a limited signaling overhead) to ensure that the signal measurement(s) will be always performed at the UE within the idle period(s) of the FFP(s).

According to a fifth aspect, a computer program product is provided. The computer program product comprises a computer-readable storage medium that stores a computer code. Being executed by at least one processor, the computer code causes the at least one processor to perform the method according to the third aspect. By using such a computer program product, it is possible to simplify the implementation of the method according to the third aspect in any network node, like the network node according to the second aspect.

According to a sixth aspect, a computer program product is provided. The computer program product comprises a computer-readable storage medium that stores a computer code. Being executed by at least one processor, the computer code causes the at least one processor to perform the method according to the fourth aspect. By using such a computer program product, it is possible to simplify the implementation of the method according to the fourth aspect in any UE, like the UE according to the first aspect.

According to a seventh aspect, a UE in a wireless communication network is provided. The UE comprises a first means for receiving a first timing configuration for a wireless communication channel in the wireless communication network from a network node. The first timing configuration comprises a sequence of FFPs. Each FFP of the sequence of FFPs comprises a channel occupancy period and an idle period for the wireless communication channel. The channel occupancy period is followed by the idle period. The UE further comprises a second means for receiving a second timing configuration for the wireless communication channel from the network node. The second timing configuration comprises an indication for the UE to perform a signal measurement within at least part of the idle period of at least one FFP of the sequence of FFPs. The UE further comprises a means for performing the signal measurement based on the first timing configuration and the second timing configuration. By so doing, it is possible (by using a limited signaling overhead) to ensure that the signal measurement(s) will be always performed at the UE within the idle period(s) of the FFP(s).

According to an eighth aspect, a network node in a wireless communication network is provided. The network node comprises a first means for generating a first timing configuration for a wireless communication channel in the wireless communication network. The first timing configuration comprises a sequence of FFPs. Each FFP of the sequence of FFPs comprises a channel occupancy period and an idle period for the wireless communication channel. The channel occupancy period is followed by the idle period. The network node further comprises a first means for transmitting the first timing configuration to a UE. The network node further comprises a second means for generating a second timing configuration for the wireless communication channel. The second timing configuration comprises an indication for the UE to perform a signal measurement within at least part of the idle period of at least one FFP of the sequence of FFPs. The processor further comprises a second means for transmitting the second timing configuration to the UE. By so doing, it is possible (by using a limited signaling overhead) to ensure that the signal measurement(s) will be always performed at the UE within the idle period(s) of the FFP(s).

Other features and advantages of the present disclosure will be apparent upon reading the following detailed description and reviewing the accompanying drawings.

BRIEF DESCRIPTION OF THE DRAWINGS

The present disclosure is explained below with reference to the accompanying drawings in which:

FIG. 4 shows a flowchart of a method for operating the network node shown in FIG. 3 in accordance with one example embodiment;

FIG. 7 shows a flowchart of a method for operating the UE shown in FIG. 5 in accordance with a second example embodiment.

DETAILED DESCRIPTION

Figure 1:
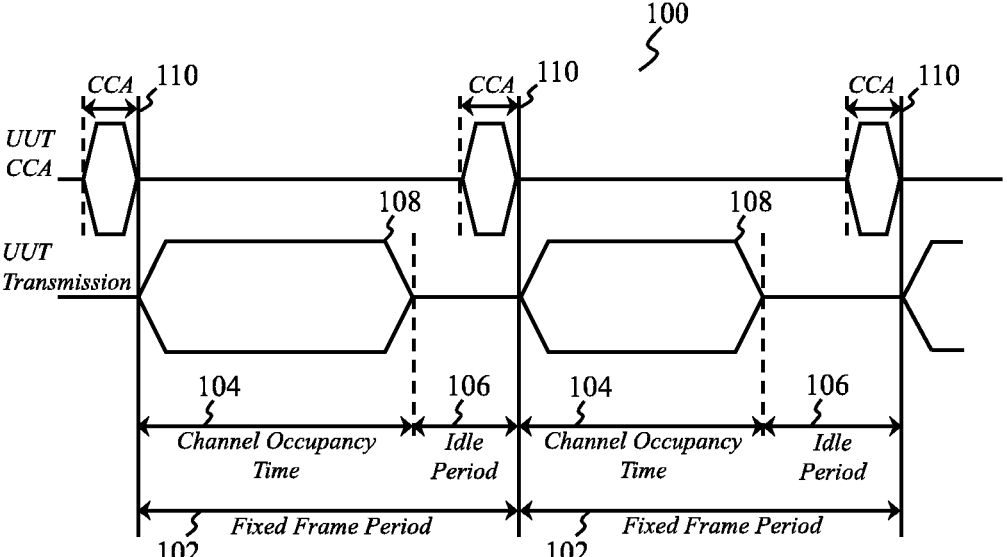
FIG. 1 shows a general structure of a timing configuration used in the Frame-Based Equipment (FBE) mechanism.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the elements presented in the appended claims.

Unless otherwise stated, any embodiment recited herein as "example embodiment" should not be construed as preferable or having an advantage over other embodiments.

Although the numerative terminology, such as "first", "second", "third", "fourth", etc., may be used herein to describe various embodiments, it should be understood that these embodiments should not be limited by this numerative terminology. This numerative terminology is used herein only to distinguish one embodiment from another embodiment. For example, a first embodiment could be renamed a second embodiment, and vice versa, without departing from the teachings of the present disclosure.

According to the example embodiments disclosed herein, a User Equipment (UE) may refer to an electronic computing device that is configured to perform wireless communications. The UE may be implemented as a mobile station, a mobile terminal, a mobile subscriber unit, a mobile phone, a cellular phone, a smart phone, a cordless phone, a personal digital assistant (PDA), a wireless communication device, a desktop computer, a laptop computer, a tablet computer, a gaming device, a netbook, a smartbook, an ultrabook, a medical mobile device or equipment, a biometric sensor, a wearable device (e.g., a smart watch, smart glasses, a smart wrist band, etc.), an entertainment device (e.g., an audio player, a video player, etc.), a vehicular component or sensor (e.g., a driver-assistance system), a smart meter/sensor, an unmanned vehicle (e.g., an industrial robot, a quadcopter, etc.) and its component (e.g., a self-driving car computer), industrial manufacturing equipment, a global positioning system (GPS) device, an Internet-of-Things (IoT) device, an Industrial IoT (IIoT) device, a machine-type communication (MTC) device, a group of Massive IoT (MIoT) or Massive MTC (mMTC) devices/sensors, or any other suitable mobile device configured to support wireless communications. In some embodiments, the UE may refer to at least two collocated and inter-connected UEs thus defined.

As used in the example embodiments disclosed herein, a network node may refer to a fixed point of communication for the UE in a particular wireless communication network. The network node may be referred to as a base transceiver station (BTS) in terms of the 2G communication technology, a NodeB in terms of the 3G communication technology, an evolved NodeB (eNodeB) in terms of the 4G communication technology, and a gNB in terms of the 5G New Radio (NR) communication technology. The RAN node may serve different cells, such as a macrocell, a microcell, a picocell, a femtocell, and/or other types of cells. The macrocell may cover a relatively large geographic area (for example, at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (for example, a home). Correspondingly, the network node serving the macrocell may be referred to as a macro node, the network node serving the microcell may be referred to as a micro node, and so on.

According to the example embodiments disclosed herein, a wireless communication network, in which the mobile UE and the network node communicate with each other, may refer to a cellular or mobile network, a Wireless Local Area Network (WLAN), a Wireless Personal Area Networks (WPAN), a Wireless Wide Area Network (WWAN), a satellite communication (SATCOM) system, or any other type of wireless communication networks. Each of these types of wireless communication networks supports wireless communications according to one or more communication protocol standards. For example, the cellular network may operate according to the Global System for Mobile Communications (GSM) standard, the Code-Division Multiple Access (CDMA) standard, the Wide-Band Code-Division Multiple Access (WCDM) standard, the Time-Division Multiple Access (TDMA) standard, or any other communication protocol standard, the WLAN may operate according to one or more versions of the IEEE 802.11 standards, the WPAN may operate according to the Infrared Data Association (IrDA), Wireless USB, Bluetooth, or ZigBee standard, and the WWAN may operate according to the Worldwide Interoperability for Microwave Access (WiMAX) standard.

Ultra-reliable low-latency communications (URLLC) is defined in the 5G NR communication technology to support different applications such as Industry 4.0, remote surgery, etc. URLLC features and requirements have been standardized in 3rd Generation Partnership Project (3GPP) Release 15 (Rel-15) and Release 16 (Rel-15) for URLLC operation in a licensed spectrum. The URLLC operation in the licensed spectrum has become more restricted due to a shortage of bandwidth when a traffic demand increases. To deal with this problem, it has been suggested to use an unlicensed spectrum for the URLLC due to its low cost, high flexibility, simplicity of deployment and availability of bandwidth. The URLLC operation in the unlicensed spectrum is one of the main work items of the 3GPP standardization starting from 3GPP Release 17 (Rel-17).

In the unlicensed spectrum, a transmitter is required to execute a channel access mechanism through CCA/LBT before acquiring a channel in a certain amount of time to transmit data. There are two channel access mechanisms: load-based equipment (LBE) and frame-based equipment (FBE). According to the LBE mechanism, a transmitter can do channel sensing to obtain the channel at any moment that it has data to transmit. According to the FBE mechanism, if the transmitter has data to transmit, it can sense the channel to check its availability for transmission and start the transmission itself only per fixed period called a Fxed Frame Period (FFP) with duration, for example, of 1, 2, 2.5, 4, 5 or 10 ms. The FBE mechanism benefits URLLC nodes when a data rate is low and data arrival is periodic because the receiver does not always have to detect blindly the presence of the transmission at any moments. This also reduces burden and energy consumption at the receiver.

FIG. 1 shows a general structure of a timing configuration 100 used in the FBE mechanism. The timing configuration 100 is a sequence of FFPs 102. It should be noted that, in practice, a network node (e.g., gNB) configures one FFP which then repeats infinitely, thereby forming the sequence of FFPs. Thus, each FFP 102 in the sequence of FFPs is the same, i.e., has the same duration which is usually within the range of 1 ms to 10 ms. The FFP 102 consists of a Channel Occupancy Time (COT) 104 followed by an idle period 106 which should be at least equal to 5% of the whole duration of the FFP 102, and at least 100 µs. An equipment (of a network node or a UE) may change its FFP 102, but it should not do this more than once every 200 ms. A first transmission 108 in the FFP 102 can start only at the beginning of the FFP 102. Immediately before starting the transmission 108 on an operating channel at the start of the FFP 102, an initiating device (e.g., a network node) should perform a CCA check (also known as a LBT measurement) during a single observation slot 110 (9 µs) within a 25 µs interval immediately before the start of the FFP 102. The operating channel should be considered occupied if an energy level in the operating channel exceeds a threshold level. If the initiating device finds the operating channel to be clear, it may transmit immediately. If the initiating device finds the operating channel occupied, then there should be no transmissions on that channel during the next FFP 102. A responding device that received a transmission grant from the initiating device may proceed with transmissions on the current operating channel: a) without performing the CCA if a transmission is initiated at most 16 µs after the last transmission by the initiating device; b) after performing the CCA on the operating channel during the single observation slot 110 (9 µs) within a 25 µs period ending immediately before the granted transmission time (i.e., the COT 108). The initiating device may resume the transmission within the acquired COT 108 without doing another CCA if the gap between the consecutive transmissions is below 16 µs, or after a 9 µs the CCA if the gap is higher.

According to 3GPP Rel-16, a gNB indicates its FFP configuration (g-FFP) to a UE through a broadcast signaling (e.g., by using System Information Block 1 (SIB1)) or a dedicated Radio Resource Control (RRC) signaling. The g-FFP duration values are restricted to {1 ms, 2 ms, 2.5 ms, 4 ms, 5 ms, 10 ms}, including the idle period. The idle period for a given Sub-Carrier Spacing (SCS)=ceil (minimum idle period allowed by regulations/Ts), where minimum idle period allowed by regulations=max (5% of FFP, 100 µs), and Ts is the symbol duration for the given SCS.

As also noted in 3GPP Rel-16, a UE may only transmit in an UL during a gNB COT after detecting a DL transmission from the gNB in the corresponding g-FFP. In other words, the UE is only allowed to transmit within the COT initiated by the gNB, i.e., as a responding device. To overcome this limitation, a UE-initiated COT for the FBE mechanism is being introduced in 3GPP Rel-17 to provide enhanced URLLC/Industrial IoT (IIoT) support for NR.

NR-U Rel-16 specifications also introduce support for Received Signal Strength Indicator (RSSI) and Channel Occupancy (CO) measurement reports. The UE performs RSSI measurements within an appositely configured RSSI Measurement Timing Configuration (RMTC), which is provided to the UE via an RRC signaling. The RSSI is an energy measurement, independent of any reference signals. Only periodic reporting is supported in 3GPP Rel-16, with a configurable reporting interval (reportInterval) from 120 ms to 1 hour. No L3 filtering of PHY measurements is performed. PHY provides to upper layer a RSSI sample for each symbol configured within the RMTC. The UE reports to the gNB:

Average RSSI: average of all the samples received within reportInterval, and

Channel Occupancy: percentage of samples above the channelOccupancyThreshold among the samples within the reportInterval.

The RSSI and CO measurement reports are introduced with the scope of providing the gNB with assistance information for selecting the unlicensed channel(s) on which to operate.

Figure 2:
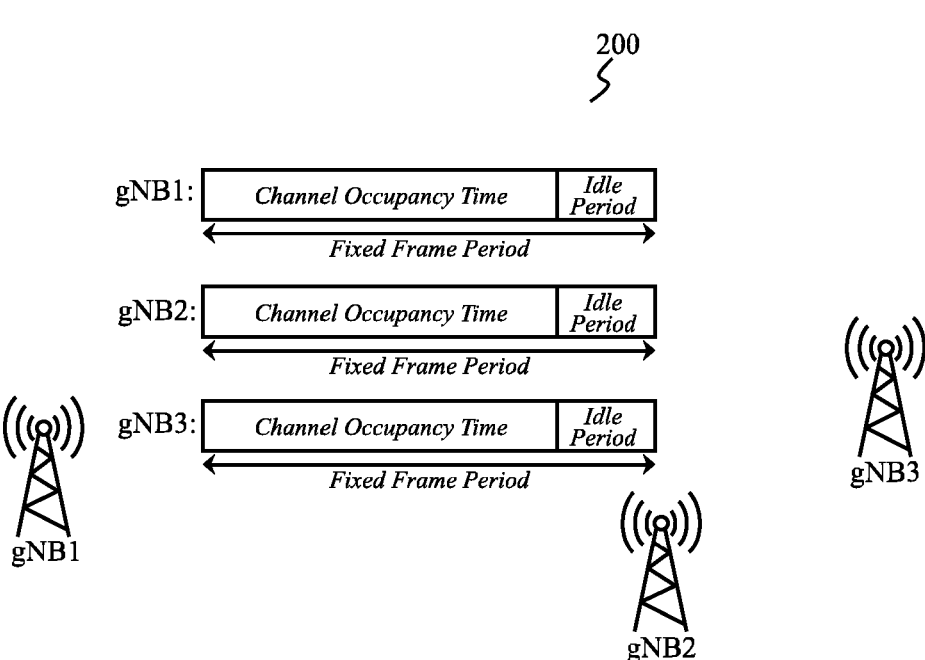
FIG. 2 shows an example network deployment with semi-static and synchronized channel access for optimized performance in controlled unlicensed environments.

FIG. 2 shows an example network deployment 200 with semi-static and synchronized channel access for optimized performance in controlled unlicensed environments. The network deployment 200 is related to three gNBs, namely: gNB1, gNB2, and gNB3. To achieve the URLLC over the unlicensed spectrum, gNB1, gNB2, and gNB3 may be deployed so that their FFPs are synchronized, i.e., the idle periods of their FFPs are perfectly aligned. In this way, when each of gNB1, gNB2, and gNB3 performs the CCA/LBT prior to transmission at the start of its FFP, the impact of intra-system interference on CCA/LBT, hence on the latency of transmission, can be avoided. The network deployment 200 is particularly suited for operation in environments with no inter-system interference (e.g., for indoor scenarios where an owner of a building has full control over the network deployment of access points of any unlicensed spectrum-based radio access technology within the building). On the other hand, sporadic inter-system interference on an unlicensed channel in a 5 GHz or 6 GHz band can always happen. It would therefore be beneficial to be able to configure UEs to perform intra-frequency RSSI measurements in time intervals when there is no intra-system interference. In this way, gNB1, gNB2, and gNB3 may timely detect unexpected and unwanted inter-system interference in the operating unlicensed channel(s) and take the appropriate recovery actions. In the network deployment 200, each of gNB1, gNB2, and gNB3 could configure the UEs to perform intra-frequency RSSI measurements during the idle periods of their FFPs.

However, with current Rel-16 specifications, it is not always possible to prepare the RMTC such that RSSI measurements occur within the idle periods of the FFPs.

Let us consider, as an example, an NR-U system operating with a semi-static channel access mode, a SCS of 30 kHz, and a periodicity of the semi-static channel access mode (denoted as "SemiStaticChannelAccessConfig") set to 10 ms. 3GPP TS 37.213 describes that a UE should determines the start of the FFP as well as the duration of the COT, and consequently of the idle period as follows:

"If a gNB provides UE(s) with higher layer parameters ChannelAccessMode-r16='semistatic' by SIB1 or dedicated configuration, a periodic channel occupancy can be initiated by the gNB every $T_x$ within every two consecutive radio frames, starting from the even indexed radio frame at $i \cdot T_y$ with a maximum channel occupancy time $T_y=0.95T_x$, where $T_x$=period in ms, is a higher layer parameter provided in SemiStaticChannelAccessConfig and i∈

$$\left\{0, 1, \ldots, \frac{20}{T_x} - 1\right\}."$$

With such FFP configuration, the FFP consists of 280 symbols: the COT equal to 266 symbols [symbol #0, . . . , symbol #265] and the idle period equal to 14 symbols [symbol #266, . . . , symbol #279].

With the specified RMTC in 3GPP TS 38.331, on the other hand, an RMTC offset can only be signaled with time granularity of 1 subframe (i.e., 1 ms). In the example above, when configured in proximity of the idle period, the RMTC can only start at symbol #251 or at symbol #0. Hence, it is clearly not possible to configure the RMTC so that the RSSI measurement occasions are exclusively contained in the idle periods of the FFPs of the gNBs. Therefore, when performing the intra-frequency RSSI measurements (i.e. on the same frequency as a serving cell), the UE will also measure (and report) signal components from the serving cell together with signal components from neighbor cells of the same network deployment (i.e., the intra-system interreference). This will not allow one to determine an inter-system interference level on the corresponding unlicensed channel.

The example embodiments disclosed herein provide a technical solution that allows mitigating or even eliminating the above-sounded drawbacks peculiar to the prior art. In particular, the technical solution disclosed herein involves generating an indication for a UE to perform a signal measurement (e.g., a RSSI measurement) within at least part of an idle period of at least one FFP from a previously signaled sequence of FFPs. Such an indication may be transmitted to the UE by using a dedicated signaling. By so doing, it is possible (by using a limited signaling overhead) to ensure that the signal measurement will be always performed within the idle period(s) of the FFP(s). In some embodiments, the indication may cause the UE to perform the signal measurements within the at least part of the idle period of every N-th FFP of the sequence of FFPs, thereby providing a more flexible configuration of the signal measurements in a wireless communication network.

Figure 3:
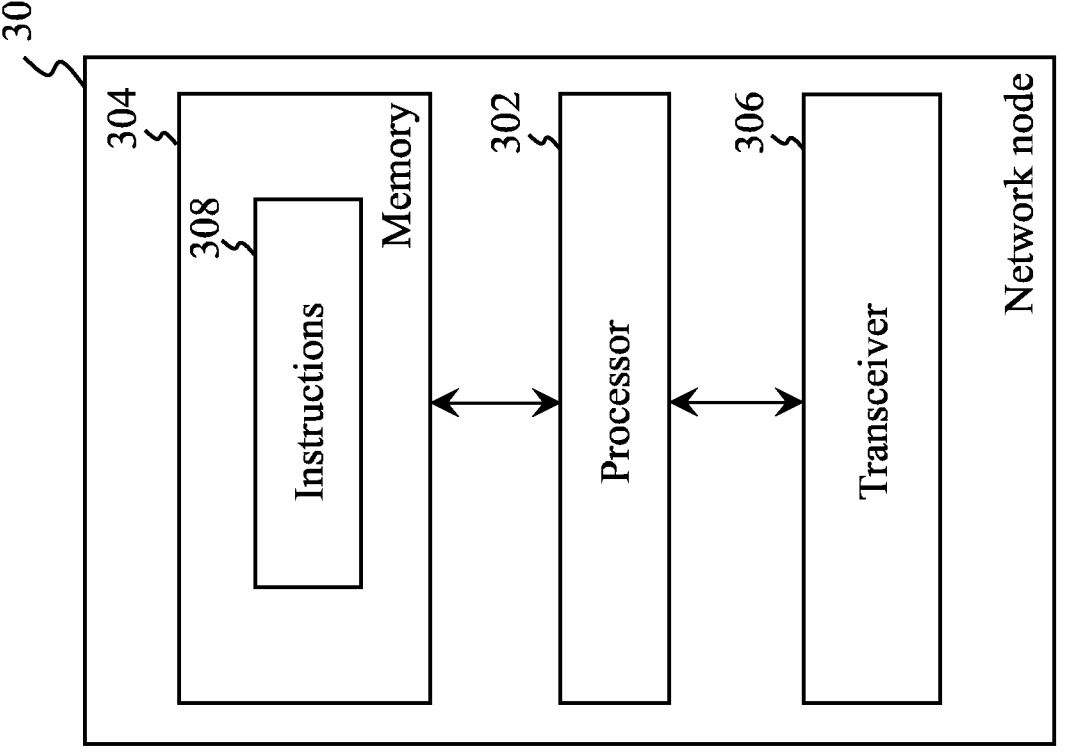
FIG. 3 shows a general block-scheme of a network node in accordance with one example embodiment.

FIG. 3 shows a general block-scheme of a network node 300 in accordance with one example embodiment. The network node 400 is intended to operate in any of the above-described wireless communication networks that, for example, supports an unlicensed spectrum. As shown in FIG. 3, the network node 300 comprises a processor 302, a memory 304, and a transceiver 306. The memory 304 stores processor-executable instructions 308 which, when executed by the processor 302, cause the processor 302 to implement the aspects of the present disclosure, as will be described below in more detail. It should be noted that the number, arrangement and interconnection of the constructive elements constituting the network node 300, which are shown in FIG. 3, are not intended to be any limitation of the present disclosure, but merely used to provide a general idea of how the constructive elements may be implemented within the network node 300. For example, the processor 302 may be replaced with several processors, as well as the memory 304 may be replaced with several removable and/or fixed storage devices, depending on particular applications. Furthermore, in some embodiments, the transceiver 306 may be implemented as two individual devices, with one for a receiving operation and another for a transmitting operation. Irrespective of its implementation, the transceiver 306 is intended to be capable of performing different operations required to perform the data reception and transmission, such, for example, as signal modulation/demodulation, encoding/decoding, etc.

The processor 302 may be implemented as a CPU, general-purpose processor, single-purpose processor, micro-controller, microprocessor, application specific integrated circuit (ASIC), field programmable gate array (FPGA), digital signal processor (DSP), complex programmable logic device, etc. It should be also noted that the processor 302 may be implemented as any combination of one or more of the aforesaid. As an example, the processor 302 may be a combination of two or more microprocessors.

The memory 304 may be implemented as a classical nonvolatile or volatile memory used in the modern electronic computing machines. As an example, the nonvolatile memory may include Read-Only Memory (ROM), ferro-electric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 308 stored in the memory 304 may be configured as a computer-executable code which causes the processor 302 to perform the aspects of the present disclosure. The computer-executable code for carrying out operations or steps for the aspects of the present disclosure may be written in any combination of one or more programming languages, such as Java, C++, or the like. In some examples, the computer-executable code may be in the form of a high-level language or in a pre-compiled form and be generated by an interpreter (also pre-stored in the memory 304) on the fly.

FIG. 4 shows a flowchart of a method 400 for operating the network node 300 in accordance with one example embodiment. The method 400 starts with a step S402, in which the processor 302 generates a first timing configuration for a wireless communication channel in the wireless communication network. The first timing configuration comprises a sequence of FFPs. Each FFP of the sequence of FFPs comprises a channel occupancy period (i.e., COT) and an idle period for the wireless communication channel. The channel occupancy period is followed by the idle period. In general, each FFP of the sequence of FFPs may look like the FPP 102. Then, the method 400 proceeds to a step S404, in which the processor 302 causes the transceiver 306 to transmit the first timing configuration to a UE. The step S404 may be performed by using a broadcast signaling (e.g., SIB1), a dedicated signaling (e.g., an RRC message), or the combination thereof. Next, the method 400 goes on to a step S406, in which the processor 302 generates a second timing configuration for the wireless communication channel. The second timing configuration comprises an indication for the UE to perform a signal measurement within at least part of the idle period of at least one FFP of the sequence of FFPs. The signal measurement may comprise a RSSI measurement, a RSRP measurement, a RSRQ measurement, or any combination thereof. After that, the method 400 proceeds to a step S408, in which the processor 302 causes the transceiver 306 to transmit the second timing configuration to the UE. The step S408 may be performed by using a dedicated signaling (e.g., an RRC message).

In one embodiment, the above-mentioned indication comprised in the second timing configuration may cause the UE to perform the signal measurements within (at least part of) the idle period of each FFP of the sequence of FFPs. In this embodiment, the indication for the UE may be presented as a Boolean parameter that takes on a value of "true" when the signal measurement is required to be performed within the idle period of each FFP of the sequence of FFPs and takes on a value of "false" when there is no such requirement. Of course, the inverse situation is also possible, i.e., the value of "false" may be used to indicate the requirement for the signal measurement to be performed within the idle period of each FFP, while the value of "true" may be used to indicate the absence of this requirement. One example of the second timing configuration implemented as the RMTC with the Boolean parameter (denoted as "parameter-1") is shown below (it should be noted that the acronym "ARFCN" stands for an Absolute Radio-Frequency Channel Number which indicates a channel/frequency where to perform the RSSI measurements, the parameter "rmtc-Frequency-r16" means a center frequency of a measured bandwidth, and the parameter "ref-SCS-CP-r16" means a reference SCS and cyclic prefix; both of the parameters "rmtc-Frequency-r16" and "ref-SCS-CP-r16" may be defined based on 3GPP Rel-16):

```
RMTC-Config-rNN ::=    SEQUENCE {
    rmtc-Frequency-r16       ARFCN-ValueNR,
    ref-SCS-CP-r16           ENUMERATED {kHz15, kHz30, kHz60-NCP, kHz60-ECP},
    parameter-1              ENUMERATED {true}
                          }
```

At the same time, in some other embodiments, the above-mentioned indication comprised in the second timing configuration may cause the UE to perform the signal measurement within (at least part of) the idle period of every N-th FFP of the sequence of FFPs, where N≥2 (N=1 corresponds to the embodiment in which the signal measurement should be performed within (at least part of) the idle period of each FFP). In this case, the indication for the UE may be presented as the combination of a Boolean parameter indicating the requirement for performing the signal measurement within (at least part of) the idle period and an additional alphanumeric parameter indicating the corresponding FFPs whose idle periods should be used for the signal measurements (e.g., every second FFP, every third FFP, every fourth FFP, etc.). One example of the second timing configuration implemented as the RMTC with the combination of the Boolean parameter (denoted as "parameter-1") and the alphanumeric parameter (denotes as "parameter-2") is shown below:

```
RMTC-Config-rNN ::=    SEQUENCE {
    rmtc-Frequency-r16       ARFCN-ValueNR,
    ref-SCS-CP-r16           ENUMERATED {kHz15, kHz30, kHz60-NCP, kHz60-ECP},
    parameter-1              ENUMERATED {true}
    parameter-2              ENUMERATED {ffp2, ffp4, ffp8, ffp16, ffp32, ffp64, ffp128},
    ...
                          }
```

Given the above example for the second timing configuration "rmtc-Frequency-r16", N=2 if parameter-2=ffp2, N=4 if parameter-2=ffp4, and so on. Thus, N may be any natural number equal to or more than 2.

It should be also noted that the generation of the second timing configuration may be based on UE UL transmissions configured to occur during the idle period(s). For example, the processor 302 may generate the second timing configuration such that the at least part of the idle period used for the signal measurements does not overlap with the following time symbols:

the time symbols during which the UE is expected to transmit the configured UL transmissions (e.g., CG-PUSCH, periodic CSI, RACH symbols), and/or the time symbols that are configured as UL symbols in the semi-static DL-UL configuration, and/or the time symbols that are indicated as UL symbols in a Slot format indicator (SFI).

In the meantime, one other embodiment is possible, in which the network node 300 signals the second timing configuration to the UE, and the UE "autonomously" determines that it shall not perform the signal measurements at least during the time symbols that are configured for UL transmissions and overlap with the at least part of the idle periods of the FFPs of the sequence of FFPs.

Figure 5:
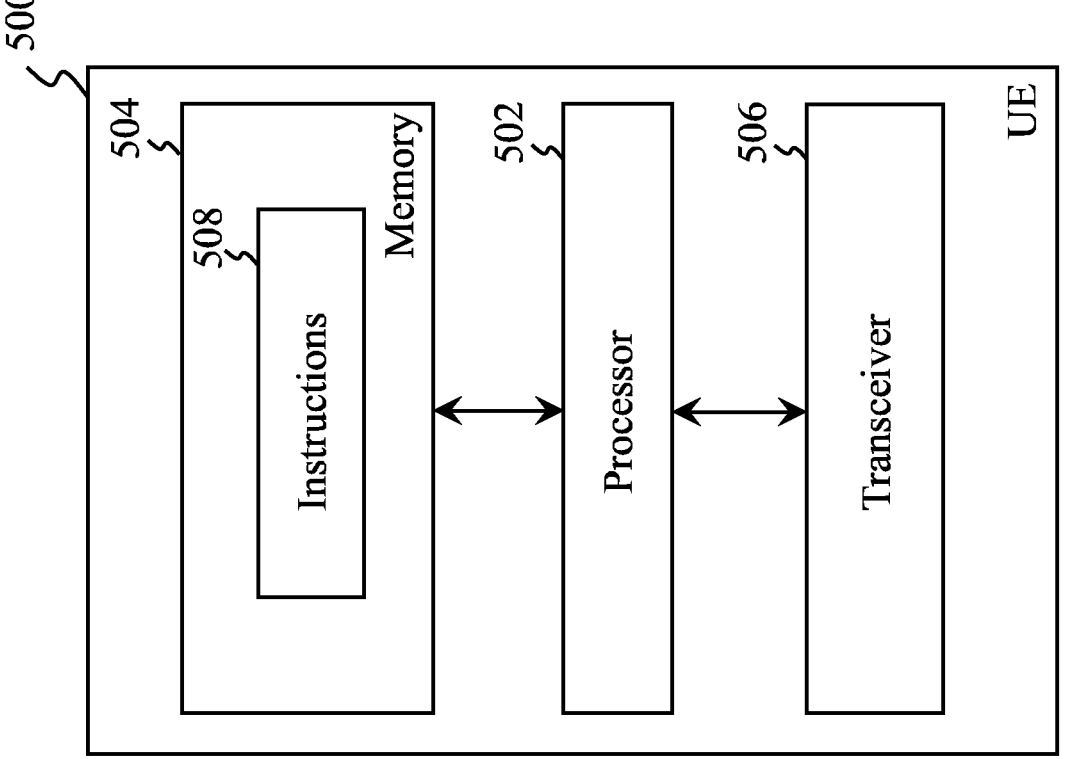
FIG. 5 shows a general block-scheme of a User Equipment (UE) in accordance with one example embodiment.

FIG. 5 shows a general block-scheme of a UE 500 in accordance with one example embodiment. The UE 500 is intended to communicate with the network node 300 in any of the above-described wireless communication networks that, for example, supports the unlicensed spectrum. As shown in FIG. 5, the UE 500 comprises a processor 502, a memory 504, and a transceiver 506. The memory 504 stores processor-executable instructions 508 which, when executed by the processor 502, cause the processor 502 to implement the aspects of the present disclosure, as will be described below in more detail. It should be noted that the number, arrangement and interconnection of the constructive elements constituting the UE 500, which are shown in FIG. 5, are not intended to be any limitation of the present disclosure, but merely used to provide a general idea of how the constructive elements may be implemented within the UE 500. In general, the processor 502, the memory 504, the transceiver 506, and the processor-executable instructions 508 may be implemented in the same or similar manner as the processor 302, the memory 304, the transceiver 306, and the processor-executable instructions 308, respectively, in the network node 300.

Figure 6:
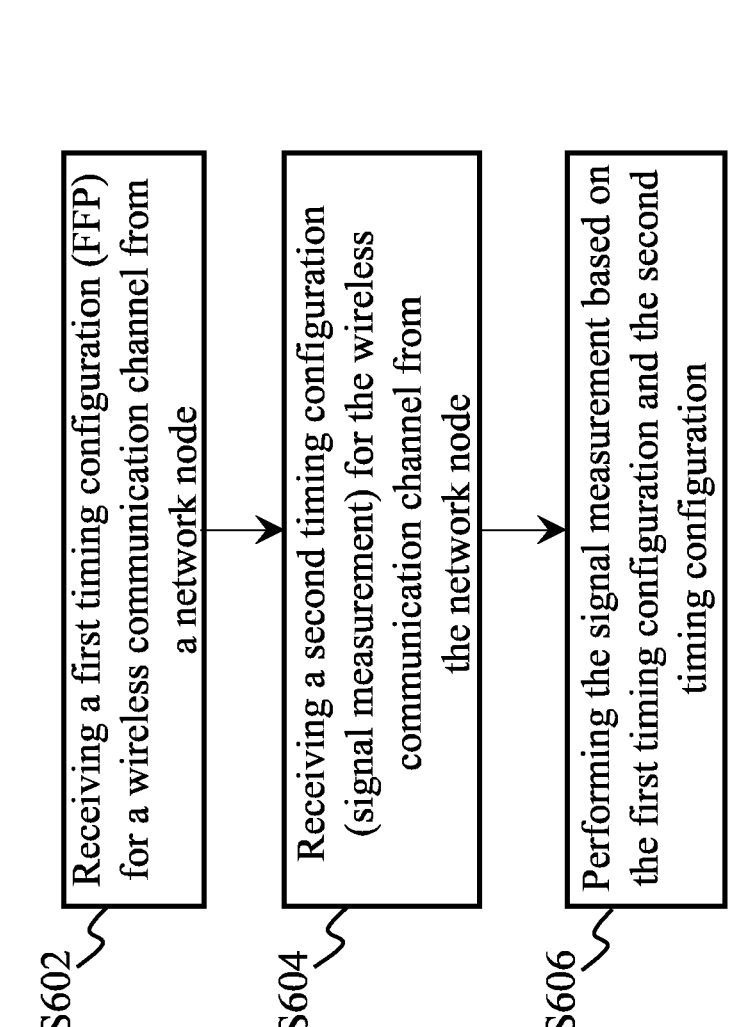
FIG. 6 shows a flowchart of a method for operating the UE shown in FIG. 5 in accordance with a first example embodiment.

FIG. 6 shows a flowchart of a method 600 for operating the UE 500 in accordance with a first example embodiment.

The method 600 starts with a step S602, in which the processor 502 causes the transceiver 506 to receive the first timing configuration for the wireless communication channel from the network node 300. As noted earlier, the first timing configuration refers to FFP configuration, i.e., the sequence of FFPs. The step S602 may be performed by using at least one of the broadcast signaling and the dedicated signaling. Then, the method 600 proceeds to a step S604, in which the processor causes the transceiver 506 to receive the second timing configuration from the network node 300. The step S604 may be performed by using the dedicated signaling. As also noted earlier, the second timing configuration comprises the indication for the UE to perform the signal measurement within (at least part of) the idle period of at least one FFP of the sequence of FFPs. After that, the method 600 goes on to a step S606, in which the processor 502 performs the signal measurement based on the first timing configuration and the second timing configuration. Subsequently, the UE 500 may generate a measurement report based on the performed signal measurement and transmit the measurement report to the network node 300.

FIG. 7 shows a flowchart of a method 700 for operating the UE 500 in accordance with a second example embodiment. The method 700 differs from the method 600 in the implementation of the indication for the UE which is signaled in the second timing configuration. More specifically, the indication for the UE is assumed to be presented either as parameter-1 or as the combination of parameter-1 and parameter-2. The method 700 starts with a step S702, in which the processor 502 causes the transceiver 506 to receive the first timing configuration from the network node 400, i.e., the FFP configuration. Then, the method 700 proceeds to a step S704, in which the processor 502 causes the transceiver 506 to receive the second timing configuration from the network node 400, i.e., the RMTC. In a next step S706, the processor 502 determines whether the second timing configuration comprises parameter-1; if there is no parameter-1, the method ends up. If parameter-1 is present, the processor 502 determines that a RMTC period should be confined within the idle periods, and defines the RMTC period, i.e., its duration and offset, in a next step S708. For example, if the first timing configuration indicates that each FFP has Offset$_{FFP}$=the start of an even-indexed frame and Duration$_{FFP}$=10 ms, then the processor 502 may set the offset of the RMTC period Offset$_{RMTC}$=start of the even-indexed frame+0.95*10 ms (=the duration of the channel occupancy period (i.e., the COT), which is 95% of the FFP), and the duration of the RMTC period=0.5 ms (=the duration of the idle period). In some other embodiments, the duration of the RMTC period may be set such that it is less than the duration of the idle period of the FFP. After that, the method 700 proceeds to a step S710, in which the processor 502 determines N. In other words, the processor 502 needs to check whether parameter-2 is included in the second timing configuration. If parameter-2 is present, the processor 502 derives N from it and confines the above-configured RMTC period (i.e., configures the RSSI measurement) within every N-th FFP of the sequence of FFPs. If parameter-2 is absent, the processor 502 deems N equal to 1, for which reason it confines the RMTC period within each FFP of the sequence of FFPs.

It should be noted that each step or operation of the methods 400, 600, 700, or any combinations of the steps or operations, can be implemented by various means, such as hardware, firmware, and/or software. As an example, one or more of the steps or operations described above can be embodied by processor executable instructions, data structures, program modules, and other suitable data representations. Furthermore, the processor-executable instructions which embody the steps or operations described above can be stored on a corresponding data carrier and executed by the processors 302 and 502, respectively. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the example embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A User Equipment (UE) in a wireless communication network, comprising:
   a transceiver;
   a processor coupled to the transceiver; and
   a memory coupled to the processor and storing processor-executable instructions, wherein the processor is configured, when executing the processor-executable instructions, to:
      by using the transceiver, receive a first timing configuration for a wireless communication channel in the wireless communication network from a network node, the first timing configuration comprising a sequence of fixed frame periods (FFPs), each FFP of the sequence of FFPs comprising a channel occupancy period and an idle period for the wireless communication channel, the channel occupancy period being followed by the idle period;
      by using the transceiver, receive a second timing configuration for the wireless communication channel from the network node, the second timing configuration comprising an indication for the UE to perform a signal measurement during at least part of the idle period of at least one FFP of the sequence of FFPs; and
      perform the signal measurement based on the first timing configuration and the second timing configuration.

2. The UE of claim 1, wherein the indication in the second timing configuration causes the UE to perform the signal measurement during the whole idle period of the at least one FFP of the sequence of FFPs.

3. The UE of claim 1, wherein the indication in the second timing configuration causes the UE to perform the signal measurement during the at least part of the idle period of each FFP of the sequence of FFPs.

4. The UE of claim 1, wherein the indication in the second timing configuration causes the UE to perform the signal measurement during the at least part of the idle period of every N FFP of the sequence of FFPs, where N is a natural number equal to or greater than two.

5. The UE of claim 1, wherein the processor is configured to receive the first timing configuration from the network node via at least one of broadcast signaling and a dedicated signaling.

6. The UE of claim 1, wherein the processor is configured to receive the second timing configuration from the network node via a dedicated signaling.

7. The UE of claim 1, wherein the signal measurement comprises at least one of a Received Signal Strength Indicator (RSSI) measurement, a Reference Signal Received Power (RSRP) measurement, and a Reference Signal Received Quality (RSRQ).

8. The UE of claim 1, wherein the processor is further configured, after receiving the second timing configuration, to:

check whether at least one time symbol configured by the network node for the UE to perform an uplink (UL) transmission overlaps with the at least part of the idle period of the at least one FFP of the sequence of FFPs; and if the at least one time symbol configured by the network node for the UE to perform the UL transmission overlaps with the at least part of the idle period of the at least one FFP of the sequence of FFPs, decide not to use the at least one time symbol for the signal measurement.

9. The UE of claim 1, wherein the processor is further configured to:

generate a measurement report based on the performed signal measurement; and by using the transceiver, transmit the measurement report to the network node.

10. A network node in a wireless communication network, comprising:

a transceiver;

a processor coupled to the transceiver; and a memory coupled to the processor and storing processor-executable instructions, wherein the processor is configured, when executing the processor-executable instructions, to:

generate a first timing configuration for a wireless communication channel in the wireless communication network, the first timing configuration comprising a sequence of fixed frame periods (FFPs), each FFP of the sequence of FFPs comprising a channel occupancy period and an idle period for the wireless communication channel, the channel occupancy period being followed by the idle period;

by using the transceiver, transmit the first timing configuration to a User Equipment (UE);

generate a second timing configuration for the wireless communication channel, the second timing configuration comprising an indication for the UE to perform a signal measurement during at least part of the idle period of at least one FFP of the sequence of FFPs; and by using the transceiver, transmit the second timing configuration to the UE.

11. The network node of claim 10, wherein the indication in the second timing configuration causes the UE to perform the signal measurement during the whole idle period of the at least one FFP of the sequence of FFPs.

12. The network node of claim 10, wherein the indication in the second timing configuration causes the UE to perform the signal measurement during the at least part of the idle period of each FFP of the sequence of FFPs.

13. The network node of claim 10, wherein the indication in the second timing configuration causes the UE to perform the signal measurement during the at least part of the idle period of every N FFP of the sequence of FFPs, where N is a natural number equal to or greater than two.

14. The network node of claim 10, wherein the processor is configured to transmit the first timing configuration to the UE via at least one of broadcast signaling and a dedicated signaling.

15. The network node of claim 10, wherein the processor is configured to transmit the second timing configuration to the UE via a dedicated signaling.

16. The network node of claim 10, wherein the signal measurement comprises at least one of a Received Signal Strength Indicator (RSSI) measurement, a Reference Signal Received Power (RSRP) measurement, and a Reference Signal Received Quality (RSRQ).

17. The network node of claim 10, wherein the processor is configured to generate the second timing configuration such that the at least part of the idle period of the at least one FFP of the sequence of FFPs does not overlap with at least one time symbol configured for the UE to perform an uplink (UL) transmission.

18. The network node of claim 10, wherein the processor is further configured to receive, by using the transceiver, a measurement report from the UE, the measurement report being based on the signal measurement performed by the UE based on the first timing configuration and the second timing configuration.

19. A method for operating a User Equipment (UE) in a wireless communication network, comprising:

receiving a first timing configuration for a wireless communication channel in the wireless communication network from a network node, the first timing configuration comprising a sequence of fixed frame periods (FFPs), each FFP of the sequence of FFPs comprising a channel occupancy period and an idle period for the wireless communication channel, the channel occupancy period being followed by the idle period;

receiving a second timing configuration for the wireless communication channel from the network node, the second timing configuration comprising an indication for the UE to perform a signal measurement during at least part of the idle period of at least one FFP of the sequence of FFPs; and based on the second timing configuration, performing the signal measurement based on the first timing configuration and the second timing configuration.

* * * * *